United States Patent [19]

Kukes

[11] Patent Number: 4,457,835

[45] Date of Patent: Jul. 3, 1984

[54] DEMETALLIZATION OF HYDROCARBON CONTAINING FEED STREAMS

[75] Inventor: Simon G. Kukes, Bartlesville, Okla.

[73] Assignee: Phillips Petroleum Company, Bartlesville, Okla.

[21] Appl. No.: 538,068

[22] Filed: Sep. 30, 1983

[51] Int. Cl.$^3$ .................. C10G 45/00; C10G 45/04; C10G 45/06

[52] U.S. Cl. .................. 208/251 H; 208/253; 208/216 PP

[58] Field of Search .............. 208/251 H, 253, 216 PP

[56] References Cited

U.S. PATENT DOCUMENTS

| | | | |
|---|---|---|---|
| 2,349,243 | 5/1944 | Bates | 196/52 |
| 3,051,648 | 8/1962 | Hess | 208/253 |
| 3,161,585 | 12/1964 | Gleim et al. | 208/264 |
| 3,196,104 | 7/1965 | Gleim | 208/264 |
| 3,227,646 | 1/1966 | Jacobson | 208/251 H |
| 3,331,769 | 7/1967 | Gatsis | 208/210 |
| 3,493,517 | 2/1970 | Jaffe | 252/437 |
| 3,507,784 | 4/1970 | O'Hara | 208/253 |
| 3,546,105 | 12/1970 | Jaffe | 208/216 |
| 3,577,353 | 5/1971 | White | 252/465 |
| 3,617,528 | 11/1971 | Helfman | 208/16 |
| 3,682,836 | 8/1972 | Jaffe | 208/216 PP |
| 3,684,688 | 8/1972 | Roselins | 208/50 |
| 3,791,967 | 2/1974 | Jaffe | 208/216 PP |
| 3,830,731 | 8/1974 | Reed, Jr. et al. | 208/211 |
| 3,891,538 | 6/1975 | Walkey | 208/50 |
| 4,192,736 | 3/1980 | Kluksdahl | 208/251 H |

FOREIGN PATENT DOCUMENTS 52-71403  6/1977  Japan .............................. 208/251 H Primary Examiner—Delbert E. Gantz
Assistant Examiner—Helane E. Maull

[57] ABSTRACT

Metals contained in a hydrocarbon containing feed stream are removed by contacting the hydrocarbon containing feed stream under suitable demetallization conditions with hydrogen and a catalyst composition comprising zirconium phosphate and copper phosphate. The life and activity of the catalyst composition may be increased by introducing a decomposable metal compound selected from the group consisting of the metals of Group V-B, Group VI-B, Group VII-B and Group VIII of the Periodic Table into the hydrocarbon containing feed stream prior to contacting the hydrocarbon containing feed stream with the catalyst composition.

15 Claims, No Drawings

DEMETALLIZATION OF HYDROCARBON CONTAINING FEED STREAMS

This invention relates to a process for removing metals from a hydrocarbon containing feed stream and a catalyst therefor.

It is well known that crude oil as well as products from extraction and/or liquifaction of coal and lignite, products from tar sands, products from shale oil and similar products may contain metals such as vanadium, nickel and iron. When these hydrocarbon containing feeds are fractionated, the metals tend to concentrate in the heavier fractions such as the topped crude and residuum. The presence of the metals make further processing of these heavier fractions difficult since the metals generally act as poisons for catalysts employed in processes such as catalytic cracking, hydrogenation or hydrodesulfurization.

It is thus an object of this invention to provide a process for removing metals from a hydrocarbon containing feed stream so as to improve the processability of such hydrocarbon containing feed stream and especially improve the processability of heavier fractions such as topped crude and residuum. It is also an object of this invention to provide a catalyst composition which is useful for demetallization.

In accordance with the present invention, a hydrocarbon containing feed stream, which also contains metals, is contacted with a catalyst composition comprising zirconium phosphate and copper phosphate in the presence of hydrogen under suitable demetallization conditions. It is believed that the metals contained in heterocyclic compounds such as porphyrines are removed from the heterocyclic compounds by the combination of heat, hydrogen and the catalyst composition of the present invention and are trapped in pores in the catalyst composition. Removal of the metals from the hydrocarbon containing feed stream in this manner provides for improved processability of the hydrocarbon containing feed stream in processes such as catalytic cracking, hydrogenation and hydrodesulfurization.

Other objects and advantages of the invention will be apparent from the foregoing brief description of the invention and the appended claims as well as the detailed description of the invention which follows.

Any metal which can be trapped in the pores of the catalyst composition of the present invention can be removed from a hydrocarbon containing feed stream in accordance with the present invention. The present invention is particularly applicable to the removal of vanadium and nickel.

Metals may be removed from any suitable hydrocarbon containing feed streams. Suitable hydrocarbon containing feed streams include petroleum products, coal pyrolyzates, products from extraction and/or liquifaction of coal and lignite, products from tar sands, products from shale oil and similar products. Suitable hydrocarbon feed streams include gas oil having a boiling range from about 205° C. to about 538° C., topped crude having a boiling range in excess of about 343° C. and residuum. However, the present invention is particularly directed to heavy feed streams such as heavy topped crudes and residuum and other materials which are generally regarded as being too heavy to be distilled. These materials will generally contain the highest concentrations of metals such as vanadium and nickel.

The demetallization catalyst employed in the process of the present invention is a composition comprising zirconium phosphate and copper phosphate. As used herein, the term phosphate includes orthophosphates, pyrophosphates, metaphosphates and polyphosphates.

The catalyst composition can be prepared by any suitable method. Coprecipitation is preferred because the catalyst composition is more effective when prepared by coprecipitation. The catalyst is generally prepared by coprecipitating any suitable zirconium salt and any suitable copper salt with any suitable phosphate. The coprecipitation may be carried out in any suitable solvent such as water or alcohol with water being the preferred solvent. The metal salts and the phosphate must be soluble in the solvent used to be suitable.

If a phosphate such as diamonium phosphate is utilized, the pH of the solution will generally be such that precipitation will occur. However, if other phosphates are used, it may be necessary to add a base such as ammonia to achieve a pH which will result in the desired precipitation.

The precipitant formed is washed, dried and calcined in the presence of a free oxygen containing gas such as air to form the catalyst.

The drying of the precipitant may be accomplished at any suitable temperature. Generally a temperature of about 20° C. to about 200° C., preferably about 100° C. to about 150° C., is utilized for a time in the range of about 1 hr. to about 30 hrs.

The calcining step is utilized to remove traces of nitrates, traces of carbon, and water and to make the structure of the catalyst composition harder. Any suitable calcining temperature can be utilized. Generally, the calcining temperature will be in the range of about 300° C. to about 800° C. with a temperature in the range of about 500° C. to about 650° C. being preferred for a time in the range of about 1 to about 24 hours, preferably about 2 to about 6 hours.

The catalyst composition can have any suitable surface area and pore volume. In general, the surface area will be in the range of about 2 to about 400 m$^2$/g, preferably about 10 to about 200 m$^2$/g, while the pore volume will be in the range of about 0.2 to about 4.0 cc/g, preferably about 0.4 to about 2.0 cc/g.

Any suitable phosphates may be utilized to prepare the catalyst composition. Suitable phosphates include $(NH_4)H_2PO_4$, $(NH_4)_2HPO_4$, $(NH_4)_3PO_4$, $(NH_4)_4P_2O_7$, corresponding phosphates and pyrophosphates of lithium, sodium, potassium, rubidium, and cesium, and $H_3PO_4$. Phosphonic acids such as phenyl phosphonic acids and the metal salts of phosphonic acids may also be used to derive phosphates for the catalyst composition if desired.

Any suitable zirconium and copper to phosphorus ratio in the catalyst composition may be used. The ratio will generally be about stoichiometric. Any suitable ratio of zirconium to copper may be used. The molar ratio of zirconium to copper will generally be in the range of about 10:1 to about 1:10 and more preferably in the range of about 3:1 to about 1:2.

The demetallization process of this invention can be carried out by means of any apparatus whereby there is achieved a contact of the catalyst composition with the hydrocarbon containing feed stream and hydrogen under suitable demetallization conditions. The process is in no way limited to the use of a particular apparatus. The process of this invention can be carried out using a fixed catalyst bed, fluidized catalyst bed or a moving catalyst bed. Presently preferred is a fixed catalyst bed.

The catalyst composition may be used alone in the reactor or may be used in combination with essentially inert materials such as alumina, silica, titania, magnesia, silicates, aluminates, alumina silicates, titanates and phosphates. A layer of the inert material and a layer of the catalyst composition may be used or the catalyst composition may be mixed with the inert material. Use of the inert material provides for better dispersion of the hydrocarbon containing feed stream. Also, other catalysts such as known hydrogenation and desulfurization catalysts may be used in the reactor to achieve simultaneous demetallization, desulfurization and hydrogenation or hydrocracking if desired.

Any suitable reaction time between the catalyst composition and the hydrocarbon containing feed stream may be utilized. In general, the reaction time will range from about 0.1 hours to about 10 hours. Preferably, the reaction time will range from about 0.4 to about 4 hours. Thus, the flow rate of the hydrocarbon containing feed stream should be such that the time required for the passage of the mixture through the reactor (residence time) will preferably be in the range of about 0.4 to about 4 hours. This generally requires a liquid hourly space velocity (LHSV) in the range of about 0.10 to about 10 cc of oil per cc of catalyst per hour, preferably from about 0.2 to about 2.5 cc/cc/hr.

The demetallization process of the present invention can be carried out at any suitable temperature. The temperature will generally be in the range of about 150° to about 550° C. and will preferably be in the range of about 350° to about 450° C. Higher temperatures do improve the removal of metals but temperatures should not be utilized which will have adverse effects on the hydrocarbon containing feed stream, such as coking, and also economic considerations must be taken into account. Lower temperatures can generally be used for lighter feeds.

Any suitable pressure may be utilized in the demetallization process. The reaction pressure will generally be in the range of about atmospheric to about 5,000 psig. Preferably, the pressure will be in the range of about 100 to about 2500 psig. Higher pressures tend to reduce coke formation but operation at high pressure may have adverse economic consequences.

Any suitable quantity of hydrogen can be added to the demetallization process. The quantity of hydrogen used to contact the hydrocarbon containing feed stock will generally be in the range of about 100 to about 10,000 standard cubic feet per barrel of the hydrocarbon containing feed stream and will more preferably be in the range of about 1000 to about 6000 standard cubic feet per barrel of the hydrocarbon containing feed stream.

In general, the catalyst composition is utilized for demetallization until a satisfactory level of metals removal fails to be achieved which is believed to result from the coating of the catalyst composition with the metals being removed. It is possible to remove the metals from the catalyst composition by certain leaching procedures but these procedures are expensive and it is generally contemplated that once the removal of metals falls below a desired level, the used catalyst will simply be replaced by a fresh catalyst.

The time in which the catalyst composition will maintain its activity for removal of metals will depend upon the metals concentration in the hydrocarbon containing feed streams being treated. It is believed that the catalyst composition may be used for a period of time long enough to accumulate 20–200 wt. % of metals, mostly Ni and V, based on the weight of the catalyst composition, from oils.

It is believed that the life of the catalyst composition and the efficiency of the demetallization process can be improved by introducing a decomposable metal compound into the hydrocarbon containing feed stream. It is believed that the metal in the decomposable metal compound could be selected from the group consisting of the metals of Group V-B, Group VI-B, Group VII-B and Group VIII of the Periodic Table. Preferred metals are molybdenum, tungsten, manganese, chromium, nickel and iron. Molybdenum is a particularly preferred metal which may be introduced as a carbonyl, acetate, acetylacetonate, octoate (octanoate), naphthenate or dithiocarbamate. Molybdenum hexacarbonyl is a particularly preferred additive.

Any suitable concentration of the additive may be added to the hydrocarbon containing feed stream. In general, a sufficient quantity of the additive will be added to the hydrocarbon containing feed stream to result in a concentration of the metal in the range of about 1 to about 1000 parts per million and more preferably in the range of about 5 to about 100 parts per million.

The following examples are presented in further illustration of the invention.

EXAMPLE I

In this example the preparation and pertinent properties of various phosphates employed as heavy oil demetallization catalysts are described.

$Zr_3(PO_4)_4$ was prepared by first dissolving 301 grams of zirconyl nitrate, $ZrO(NO_3)_2$, in 1 liter of hot water and then adding to this solution, with stirring, a solution of 151 grams of $(NH_4)_2HPO_4$ in 400 cc of hot water. The resulting solution was filtered to obtain the zirconium phosphate precipitate. The precipitate was washed with 2 liters of water, dried at about 120° C. overnight, and calcined in air at 550° C. for 5 hours. The calcined $Zr_3(PO_4)_4$ had a surface area of 64.9 m²/gram, a pore volume of 0.76 cc/gram, a bound Zr content of 43.5 weight-%, a bound P content of 15.9 weight-%, a bound O content of 42.3 weight-%, and was essentially amorphous as indicated by X-ray diffraction measurement. This zirconium phosphate catalyst was employed in Runs 1, 2, 4 and 5.

Mixed zirconium phosphate-nickel phosphate was prepared by dissolving 116.5 grams (0.5 mole) of $ZrOCl_2.4H_2O$ and 145 grams (0.5 mole) of $Ni(NO_3)_2.6H_2O$ in 1.5 liters of hot water. A solution of 150 grams of $(NH_4)_2HPO_4$ in 0.7 liter of warm water was added to the first solution (containing zirconyl chloride and nickel nitrate) with stirring for 30 minutes. The resulting mixture was filtered to obtain the precipitate. The zirconium phosphate-nickel phosphate (Zr-Ni-PO$_4$) filter cake was washed with 1 liter of warm water. The filter cake was then slurried in 2 liters of hot water, stirred for 1 hour, filtered and washed with 1 liter of hot water. The washed nickel phosphate-zirconium phosphate was dried for about 16 hours in a vacuum oven at 120° C. and calcined in air at about 560° C. for 4 hours. The resulting catalyst's surface area was 56 m²/grams, its pore volume (determined by mercury porosimetry) was 0.90 cc/gram, and the volume of pores having a diameter smaller than 300 Å (calculated from BET nitrogen adsorption) was 0.16 cc/gram. This catalyst was employed in runs 15 and 16.

The catalyst of this invention, coprecipitated $Zr_3(PO_4)_4$-$Cu_3(PO_4)_2$, was prepared as follows: 47 grams of cupric nitrate and 27 grams of $ZrO(NO_3)_2$ were dissolved in 1 liter of hot water. Then a solution of 83 grams of $(NH_4)_2HPO_4$ in 400 mL of water was added to the first solution with stirring. The formed precipitate was filtered from the mixture of the two solutions, washed twice with 1.5 liter of hot water, dried at about 120° C. overnight, and calcined in air at 550° C. for 4 hours. The surface area of this coprecipitated $Cu_3(PO_4)_2$-$Zr_3(PO_4)_4$ (determined by BET with $N_2$) was 73.4 m²/g, and its pore volume (determined by mercury porosimetry) was 1.05 cc/g. Elemental analysis data were: 29.0 weight-% Zr, 11.3 weight-% Cu, 16.7 weight-% P and 42.3 weight-% O. The atomic ratio of Zr:Cu was about 1.8:1. This coprecipitated phosphate was employed in runs 3, 6-14.

was vented. Vanadium and nickel content in oil was determined by plasma emission analysis.

The feed was a mixture of 26 weight-% toluene and 74 weight-% Venezuelan Monagas pipeline oil having an API gravity of about 17-18 with the exception of runs 15 and 16 in which undiluted Monagas pipeline oil was used. The hydrogen pressure was maintained at about 1000 psig in all experiments (with the exception of Runs 15 and 16) which generally lasted from about 2-6 hours. The reactor temperature (average of thermocouple readings at four reactor locations) was about 375°-435° C. The liquid hourly space velocity (LHSV) of the feed ranged from about 0.5 cc/cc catalyst/hour to about 2 cc/cc catalyst/hour.

EXAMPLE III

Results of heavy oil demetallization runs at 425° C. in accordance with the procedure described in Example II are summarized in Table I.

TABLE I

| | | | | | Feed | | | Product | | | |
|---|---|---|---|---|---|---|---|---|---|---|---|
| Run | LHSV (c/cc/hr) | Catalyst | Pore Volume (cc/g) | Run Time (Hours) | Vanadium (ppm) | Nickel (ppm) | Total (V + Ni) (ppm) | Vanadium (ppm) | Nickel (ppm) | Total (V + Ni) (ppm) | Removal of Metals (%) |
| 1 (Control) | 0.99 | $Zr_3(PO_4)_4$ | 0.76 | 3.0 | 269 | 62.6 | 331.6 | 81.8 | 27.0 | 109.8 | 77 |
| 2 (Control) | 0.96 | $Zr_3(PO_4)_4$ | 0.76 | 4.0 | 217 | 39.2 | 256.2 | 74.1 | 19.4 | 93.5 | 64 |
| 3 (Invention) | 1.02 | Zr—Cu—PO$_4$ | 1.05 | 3.4 | 296 | 73.5 | 369.5 | 26.8 | 21.2 | 48.0 | 87 |
| 4 (Control) | 1.60 | $Zr_3(PO_4)_4$ | 0.76 | 2.5 | 269 | 62.6 | 331.6 | 148.0 | 42.7 | 190.7 | 42 |
| 5 (Control) | 1.53 | $Zr_3(PO_4)_4$ | 0.76 | 2.1 | 217 | 39.2 | 256.2 | 113.0 | 27.1 | 140.1 | 45 |
| 6 (Invention) | 1.48 | Zr—Cu—PO$_4$ | 1.05 | 3.0 | 296 | 92.1 | 388.1 | 126.0 | 43.2 | 169.2 | 56 |
| 7 (Invention) | 1.48 | Zr—Cu—PO$_4$ | 1.05 | 2.0 | 296 | 92.1 | 388.1 | 98.7 | 35.7 | 134.4 | 65 |
| 8 (Invention) | 1.98 | Zr—Cu—PO$_4$ | 1.05 | 3.9 | 296 | 73.5 | 369.5 | 165.0 | 57.4 | 222.4 | 40 |
| 9 (Invention) | 2.00 | Zr—Cu—PO$_4$ | 1.05 | 5.5 | 296 | 73.5 | 369.5 | 198.0 | 63.4 | 261.4 | 29 |
| 10 (Invention) | 2.01 | Zr—Cu—PO$_4$ | 1.05 | 5.7 | 296 | 73.5 | 369.5 | 201.0 | 62.9 | 263.9 | 29 |

EXAMPLE II

This example illustrates the experimental setup for investigating the demetallization of heavy oils by employing various phosphate catalysts. Oil, with or without a dissolved decomposable molybdenum compound, was pumped by means of a LAPP Model 211 (General Electric Company) pump to a metallic mixing T-pipe where it was mixed with a controlled amount of hydrogen gas. The oil/hydrogen mixture was pumped downward through a stainless steel trickle bed reactor, 28.5 inches long and 0.75 inches in diameter, fitted inside with a 0.25 O.D. axial thermocouple well. The reactor was filled with a top layer (3.5 inches below the oil/H$_2$ feed inlet) of 50 cc of low surface area (less than 1 m²/gram) α-alumina, a middle layer of 50 cc of a phosphate catalyst, and a bottom layer of 50 cc of α-alumina. The reactor tube was heated by a Thermcraft (Winston-Salem, N.C.) Model 211 3-zone furnace. The reactor temperature was usually measured in four locations along the reactor bed by a traveling thermocouple that was moved within the axial thermocouple well. The liquid product was collected in a receiver, filtered through a glass frit and analyzed. Exiting hydrogen gas Data in Table I show that at comparable LHSV coprecipitated $Zr_3(PO_4)_4$—$Cu_3(PO_4)_2$ was more effective than $Zr_3(PO_4)_4$ in removing Ni and V from heavy oil at 425° C. (compare run 3 with runs 1 and 2; runs 6, 7 with runs 4, 5).

EXAMPLE IV

Results of the demetallization of heavy oils at 400° C. in accordance with the procedure described in Example II are summarized in Table II.

TABLE II

| | | | | | Feed | | | Product | | | Removal |
|---|---|---|---|---|---|---|---|---|---|---|---|
| Run | LHSV (c/cc/hr) | Catalyst | Pore Volume (cc/g) | Run Time (Hours) | Vanadium (ppm) | Nickel (ppm) | Total (V + Ni) (ppm) | Vanadium (ppm) | Nickel (ppm) | Total (V + Ni) (ppm) | of (V + Ni) (%) |
| 11 (Invention) | 0.45 | Zr—Cu—Po$_4$ | 1.05 | 6.0 | 296 | 73.5 | 369.5 | 16.9 | 14.7 | 31.6 | 91 |
| 12 (Invention) | 1.05 | Zr—Cu—PO$_4$ | 1.05 | 3.0 | 296 | 73.5 | 369.5 | 64.9 | 36.0 | 100.9 | 73 |
| 13 (Invention) | 1.49 | Zr—Cu—PO$_4$ | 1.05 | 3.0 | 296 | 92.1 | 388.1 | 213.0 | 60.0 | 273.0 | 30 |
| 14 (Invention) | 1.52 | Zr—Cu—PO$_4$ | 1.05 | 2.0 | 296 | 73.5 | 369.5 | 89.8 | 43.7 | 133.5 | 64 |

Data in Table II show that, at 400° C., the coprecipitated $Zr_3(PO_4)_4$-$Cu_3(PO_4)_2$ catalyst was quite effective in removing Ni and V from heavy oil, especially at a low liquid hourly space velocity of about 0.5-1.1.

EXAMPLE V

In this example, the results of extended demetallization runs of up to 3 months in an automated reactor similar to the one described in Example II employing the coprecipitated catalyst (Zr-Ni-PO$_4$) similar to the inventive one (Zr-Cu-PO$_4$) are described. Undiluted, heavy Monagas pipeline oil was used as the feed. It contained 88 ppm of Ni, 337 ppm of V, 2.73 weight-%

S, 73.7 volume-% residual oil (boiling point higher than 650° F.), 24.7 volume-% of distillate (boiling range of 400°-650° F.); and it had an API gravity of 12.3°.

In this demetallization run, the reactor temperature was 407° C. (765° F.), the oil feed LHSV was 0.9-1.1 cc/cc catalyst/hr, the total pressure was 2250 psig, and the hydrogen feed rate was 4800 SCF/bbl (standard cubic feet of H₂ per barrel of oil). The metal removal achieved with zirconium-nickel phosphate was greater when Mo(CO)₆ was added as an additional demetallization agent to the feed oil. Results are summarized in Table III.

TABLE III

| Run | Mo in Feed (ppm) | Catalyst | Hours on Stream | Metals in Product (ppm) V | Ni | V + Ni | Removal of V + Ni (%) |
|---|---|---|---|---|---|---|---|
| 15 | 0 | Zr—Ni—PO₄ | 117 | 93 | 49 | 142 | 66 |
|  | 0 | Zr—Ni—PO₄ | 233 | 114 | 55 | 169 | 60 |
|  | 0 | Zr—Ni—PO₄ | 257 | 109 | 54 | 163 | 61 |
|  | 0 | Zr—Ni—PO₄ | 303 | 104 | 51 | 155 | 63 |
|  | 0 | Zr—Ni—PO₄ | 390 | 118 | 50 | 168 | 60 |
|  | 0 | Zr—Ni—PO₄ | 436 | 108 | 45 | 153 | 64 |
|  | 0 | Zr—Ni—PO₄ | 532 | 109 | 49 | 158 | 63 |
|  | 0 | Zr—Ni—PO₄ | 789 | 89 | 47 | 136 | 68 |
|  | 0 | Zr—Ni—PO₄ | 1008 | 118 | 42 | 160 | 62 |
|  | 0 | Zr—Ni—Po₄ | 1228 | 108 | 46 | 154 | 64 |
|  | 0 | Zr—Ni—PO₄ | 1416 | 110 | 42 | 152 | 64 |
|  | 0 | Zr—Ni—PO₄ | 1717 | 135 | 48 | 183 | 57 |
|  | 0 | Zr—Ni—PO₄ | 2189 | 135 | 49 | 184 | 57 |
| 16 | 70 | Zr—Ni—PO₄ | 124 | 90 | 40 | 130 | 69 |
|  | 70 | Zr—Ni—PO₄ | 220 | 92 | 42 | 134 | 68 |
|  | 70 | Zr—Ni—PO₄ | 244 | 68 | 36 | 104 | 75 |
|  | 70 | Zr—ni—Po₄ | 327 | 78 | 38 | 116 | 73 |
|  | 70 | Zr—Ni—PO₄ | 375 | 81 | 37 | 118 | 72 |
|  | 70 | Zr—Ni—PO₄ | 423 | 74 | 36 | 110 | 74 |
|  | 70 | Zr—Ni—PO₄ | 471 | 68 | 35 | 103 | 76 |
|  | 70 | Zr—Ni—PO₄ | 495 | 64 | 34 | 98 | 77 |

Data in Table III show that the catalyst of this example, $Zr_3(PO_4)_4 14 Ni_3(PO_4)_2$, essentially retained its activity after about 2 months on stream. However, when the feed oil contained about 70 ppm of Mo (as dissolved Mo(CO)₆, the demetallization activity of the zirconium phosphate-nickel phosphate increased about 10% after almost 500 hours (3 weeks) on stream. The removal of V and Ni was consistently higher, especially after about 200 hours on-stream, than a system without Mo(CO)₆ (compare Runs 15 and 16). Substantially all iron (approximately 56 ppm in oil) was also removed with zirconium phosphate-nickel phosphate with and without added Mo(CO)₆. Based on these results, it is believed that the addition of molybdenum to the feed oil would also be beneficial when the inventive zirconium phosphate-copper phosphate catalyst is used.

That which is claimed is:

1. A process for the demetallization of a hydrocarbon containing feed stream, which contains metals, comprising the step of contacting said hydrocarbon containing feed stream under suitable demetallization conditions with hydrogen and a catalyst composition comprising zirconium phosphate and copper phosphate.

2. A process in accordance with claim 1 wherein said metals in said hydrocarbon containing feed stream are vanadium and nickel.

3. A process in accordance with claim 1 wherein said catalyst composition is a coprecipitated zirconium phosphate and copper phosphate.

4. A process in accordance with claim 1 wherein said catalyst composition has a surface area in the range of about 2 to about 400 m²/gram and has a pore volume in the range of about 0.2 to about 4.0 cc/gram.

5. A process in accordance with claim 4 wherein said catalyst composition has a surface area in the range of about 10 to about 200 m²/gram and has a pore volume in the range of about 0.4 to about 2.0 cc/gram.

6. A process in accordance with claim 1 wherein the ratio of zirconium and copper to phosphorus in said catalyst composition is about stoichiometric and wherein the molar ratio of zirconium to copper is in the range of about 10:1 to about 1:10.

7. A process in accordance with claim 6 wherein the ratio of zirconium and copper to phosphorus in said catalyst composition is about stoichiometric and wherein the molar ratio of zirconium to copper is in the range of about 3:1 to about 1:2.

8. A process in accordance with claim 1 wherein said suitable demetallization conditions comprise a reaction time between said catalyst composition and said hydrocarbon containing feed stream in the range of about 0.1 hours to about 10 hours, a temperature in the range of 150° C. to about 550° C., a pressure in the range of about atmospheric to about 5000 psig and a hydrogen flow rate in the range of about 100 to about 10,000 standard cubic feet per barrel of said hydrocarbon containing feed stream.

9. A process in accordance with claim 8 wherein said suitable demetallization conditions comprise a reaction time between said catalyst composition and said hydrocarbon containing feed stream in the range of about 0.4 hours to about 4 hours, a temperature in the range of 350° C. to about 450° C., a pressure in the range of about 100 to about 2500 psig and a hydrogen flow rate in the range of about 1000 to about 6,000 standard cubic feet per barrel of said hydrocarbon containing feed stream.

10. A process in accordance with claim 1 wherein a decomposable metal compound is introduced into said hydrocarbon containing feed stream prior to the contacting of said hydrocarbon containing feed stream with said catalyst composition, wherein the metal in said decomposable metal compound is selected from the group consisting of the metals of Group V-B, Group VI-B, Group VII-B and Group VIII of the Periodic Table.

11. A process in accordance with claim 10 wherein the metal in said decomposable metal compound is molybdenum.

12. A process in accordance with claim 11 wherein said decomposable metal compound is a carbonyl, acetate, acetylacetonate, octoate, naphthenate or dithiocarbamate.

13. A process in accordance with claim 12 wherein said decomposable metal compound is molybdenum hexacarbonyl.

14. A process in accordance with claim 10 wherein a sufficient quantity of said decomposable metal compound is added to said hydrocarbon containing feed stream to result in a concentration of the metal in said decomposable metal compound in the range of about 1 to about 1000 ppm in said hydrocarbon containing feed stream.

15. A process in accordance with claim 14 wherein a sufficient quantity of said decomposable metal compound is added to said hydrocarbon containing feed stream to result in a concentration of the metal in said decomposable metal compound in the range of about 5 to about 100 ppm in said hydrocarbon containing feed stream.

* * * * *